United States Patent [19]

Lee et al.

[11] Patent Number: 5,466,280

[45] Date of Patent: Nov. 14, 1995

[54] INORGANIC COATING COMPOSITION HAVING HIGH-HEAT-RESISTING, ANTI-RUSTING AND ANTI-CORROSIVE PROPERTIES

[76] Inventors: Chwen-Chern Lee, 4F, No. 7, Lane 60, Sec. 1, Chung-She Rd., Shih-Lin Dist., Taepei City; Show-Wei Lee, No. 33, Lane 47, Sec. 1, Hsin-Sheng N. Rd., Chung-Shan Dist., Taipei City, both of Taiwan

[21] Appl. No.: 201,260

[22] Filed: Feb. 24, 1994

[51] Int. Cl.⁶ .............................. C09D 5/00; C09D 1/02
[52] U.S. Cl. .................. 106/14.12; 106/14.21; 106/629; 106/690; 106/691; 106/692; 106/695; 252/62
[58] Field of Search .................. 106/629, 690, 106/691, 692, 695, 14.05, 14.12, 14.21; 252/62; 428/920

[56] References Cited

U.S. PATENT DOCUMENTS

| | | | |
|---|---|---|---|
| 3,669,699 | 6/1972 | Doi | 106/629 |
| 3,930,876 | 1/1976 | Nakajima et al. | 106/629 |
| 4,295,899 | 10/1981 | Oppen | 106/629 |
| 4,328,033 | 5/1982 | Boberski et al. | 106/629 |
| 4,383,866 | 5/1983 | Nowakowski et al. | 106/629 |

FOREIGN PATENT DOCUMENTS

| | | | |
|---|---|---|---|
| 53-149225 | 12/1978 | Japan | 106/629 |
| 58-204857 | 11/1983 | Japan | 106/629 |
| 590290 | 1/1978 | U.S.S.R. | 106/629 |
| 1189834 | 11/1985 | U.S.S.R. | 106/691 |

*Primary Examiner*—Anthony Green
*Attorney, Agent, or Firm*—Knobbe, Martens, Olson & Bear

[57] ABSTRACT

An inorganic coating composition has a curable powder which contains a hydraulic calcium aluminate compound, a metallic oxide reinforcing agent and a pigment, and a binder solution which contains an alkali-metal silicate solution and a soluble phosphate.

4 Claims, No Drawings

INORGANIC COATING COMPOSITION HAVING HIGH-HEAT-RESISTING, ANTI-RUSTING AND ANTI-CORROSIVE PROPERTIES

BACKGROUND OF THE INVENTION

1. Field of the Invention

This invention relates to a coating composition, more particularly to an inorganic coating composition having high-heat-resisting, anti-rusting and anti-corrosive properties.

2. Description of the Related Art

Metallic materials which are used in a high-temperature atmosphere may comprise superalloys, heat-resisting steels and stainless steels. Theses materials generally contain more nickel and chromium so as to achieve high-temperature resistance and high-corrosion resistance. However, such materials are not widely used because of their high costs. It is more common to use low-carbon steels and low-alloy steels, due to their relatively low costs, by applying coatings thereon for protection against corrosion.

Surface coating methods for metals generally comprise gilding, metal spraying, electroplating, ceramic coating, porcelain enamelling and painting. Among these methods, gilding, metal spraying, electroplating, ceramic coating and porcelain enamelling require special instruments and operating conditions, and are not suitable for applying to bulky substances and parts of apparatuses after assembly. The methods of gilding, metal spraying, electroplating, ceramic coating and porcelain enamelling are not convenient as compared to painting. However, organic coating materials which are used conventionally in painting are heat-sensitive and prone to decomposition. They generate smoke when burned or incompletely burned, thereby producing or evolving toxic gases.

Inorganic coating materials generally containing alkali-metal silicate as a binder are advantageous in terms of heat-resistance and non-flammability as compared to the organic coating materials. However, since conventional inorganic coating materials, do not have sufficient heat-resisting properties, they are generally applied to concrete walls and concrete floors of an architecture. Specifically, conventional inorganic coating materials containing alkali-metal silicate have a disadvantage in that the inorganic coating materials require hardening agents, such as fluoride, mineral acid, metal powder, polyvalent metal oxide, and polyvalent metal hydroxide, to eliminate their water soluble characteristics so as to improve the forming properties of their coating films. Another disadvantage thereof is that a high temperature is necessary for hardening and curing such an inorganic material. For example, in Japanese Patent Publication (Kokai) H-2-129269, potassium silicate and ultra fine powdered silicon dioxide are dissolved in water under heat in order to form a binder. The binder is then formulated With inorganic fibrous fine powders and a pigment to form a coating composition. This coating composition needs to be heated at 180° C. for about 30 minutes so as to be cured. Japanese Patent Publication (Kokai) H-3-31367 discloses a heat resistant (650° C.) coating for inorganic materials, such as metals, glass and concrete plates. The coating is of a sprayable water-based alkali-metal silicate and should be heated at 230° C. for about 20 minutes for being cured.

Conventional metal coating techniques need 12 processing steps including pretreatment, such as degreasing, descaling and chemical treatments, in order to achieve an intimate bonding between the coating film and the metal substrate thereof. Particularly, degreasing and descaling are time-consuming and highly influence the durability of the coating film.

SUMMARY OF THE INVENTION

Therefore, the objective of this invention is to provide an improved inorganic coating composition having high heat-resisting, anti-rusting and anti-corrosive properties so as to eliminate the above-mentioned disadvantages of the conventional coating materials.

Accordingly, an inorganic coating composition of this invention has high-heat-resisting, anti-rusting and anti-corrosive properties, and comprises a curable powder and a binder solution. The curable powder contains 100 parts by weight of a hydraulic calcium aluminate compound and 5 to 50 parts by weight of a metallic oxide reinforcing agent. The curable powder further contains a pigment of 1 to 10 parts by weight. The binder solution contains an alkali-metal silicate solution and a soluble phosphate. The curable powder and the binder solution are packaged separately so as to be isolated from each other before use. They are mixed only when they must be used. When the curable powder and the binder, solution are mixed, the mixture is hardened hydraulically and by air-setting. The mixture of the curable powder and the binder solution forms a spinel oxide composite or the solid solution thereof at high temperature.

The hydraulic calcium aluminate compound preferably contains aluminate oxide of at least 50% by weight. The metallic oxide reinforcing agent preferably contains a mixture of at least two metal oxides, and the metals in the metal oxides preferably have different valence numbers. The mixture of the metallic oxide reinforcing agent may contain magnesium oxide, and may further contain chromium oxide (III), aluminum oxide, calcined fire clay, ferric oxide, light-burned talc, hard-burned lime or titanium oxide, etc. The magnesium oxide is preferable a hard-burned magnesia. The pigment suitable for the invention is a heat-resisting inorganic pigment, an anti-rusting inorganic pigment, or a mixture of the heat-resisting inorganic pigment and the anti-rusting inorganic pigment. The anti-rusting inorganic pigment preferably contains a vanadium compound. Alkali metals suitable for the alkali-metal silicate solution of this invention are sodium, potassium and lithium. Suitable phosphates are sodium phosphate and potassium phosphate.

Generally, the hydraulic calcium aluminate compound, the metallic oxide reinforcing agent and the pigment are prepared, blended and fed into a ball-type grinding mill in order to form the curable powder with a particle size of below 44 μm. The binder solution is formed by dissolving the soluble phosphate in the alkali-metal silicate solution. The curable powder is a dry blended powder, whereas the binder solution is obtained by wet blending.

DETAILED DESCRIPTION OF THE PREFERRED EMBODIMENTS

Preferably, the curable powder and the binder solution of the inorganic coating composition according to the present invention are mixed together with the ratio of from 100:50 to 100:100 by weight. The mixture of the curable powder and the binder solution can be applied directly on the surface of a steel substrate which has undergone only a degreasing pretreatment. The coating film formed on the steel substrate can be air-setting at normal temperature without heat. When the coated steel substrate is used in a high temperature atmosphere, the phosphate and silicate in the coating film undergo dehydration and condensation reactions as the result of the initial temperature increment of the coated steel substrate due to the environmental heat, and form inorganic polymers which have high heat-resisting and high adhesion characteristics. After the temperature of the coated steel substrate is increased to a higher temperature, the metal oxides in the coating film may undergo a solid phase reaction to form a composite oxide or the solid solution thereof, thereby achieving a strong composite reinforced coating film. Such a composite reinforced coating film has high mechanical strength, high hardness, good chemical stability, good thermal shock property and good resistance to salt water. The composite reinforced coating film does not burn and does not produce smoke and toxic gases. The composite reinforced coating film on the steel substrate can prevent the steel substrate from oxidation at high temperature, thereby minimizing the problem of corrosion.

The hydraulic calcium aluminate compound of the curable powder may be commercially available alumina cement, preferably containing over 50% of $Al_2O_3$, below 40% of CaO, below 8% of $SiO_2$ and below 2.5% of $Fe_2O_3$. The higher $Al_2O_3$ content may increase the heat-resisting property of the coating. Examples of high $Al_2O_3$ containing compounds are commercial fire-resistant alumina cements.

The metal in each metal oxide of the mixture of the metallic oxide reinforcing agent has a valence number of above 2. The metal oxides may be acidic oxides, neutral oxides, basic oxides, a composite of more than one of the above-described oxides and the solid solution of said composite. The acidic oxide may be silica, zirconia, titanium oxide and calcined fire clay. The neutral oxide may be aluminum oxide, chromium oxide, ferric oxide, cobalt oxide and nickel oxide. The basic oxide may be magnesium oxide, hard-burned lime (CaO). The composite oxide and the solid solution ay be spinel ($MgO.Al_2O_3$), zircon ($ZrO_2.SiO_2$), mullite ($3Al_2O_3.2SiO_2$), calcined talc ($3MgO.4SiO_2$), ceramic fibers, etc. Metal oxides with high purity is preferable, but in order to maintain the stability thereof, the presence of a little amount of impurity, such as sodium oxide or potassium oxide, is acceptable.

The metal suitable for the mixture of the metallic oxide reinforcing agent preferably has a coordination number equal to that of the steel substrate to be coated with the inorganic coating composition. Furthermore, the metal preferably has a relatively small ionic radius and a relatively small ionic diffusion coefficient. The metal oxide preferably has a specific volume of about 1.3–2.2 and should be chemically stable. It is more preferable that the metal oxide can form a spinel type composite oxide film on the substrate at high temperature, and exhibit a good corrosion-resistant property. Suitable metal oxide are divalent metal oxides such as magnesium oxide, and trivalent metal oxides such as aluminum oxide and chromium oxide. Other suitable metal oxides which are capable of being bonded intimately to the steel substrate are divalent metal oxides, such as cobalt oxide and nickel oxide, and quadrivalent metal oxides, such as manganese oxide. The metallic oxide reinforcing agent is preferably a mixture containing at least two oxides having metals of different valence numbers. The mixture may be a mixture of a basic oxide and a neutral oxide, a mixture of a neutral oxide and an acidic oxide, and a mixture of a basic oxide, a neutral oxide and an acidic oxide. A mixture of a basic oxide and a neutral oxide is preferable.

The amount of the metallic oxide reinforcing agent in the curable powder is 5–50 parts by weight, preferably 30 parts by weight, based on 100 parts by weight of the hydraulic calcium aluminate compound. When the amount of the metallic oxide reinforcing agent is below 5 parts by weight, the restraining effect for thermal expansion and contraction of the coating film on the steel substrate is poor and prone to cracking and peeling. When the amount of the metallic oxide reinforcing agent is above 50 parts by weight, the adhesion characteristic and the strength of the coating film will decrease.

The pigment in the curable powder may be a heat-resisting inorganic pigment and an anti-rusting inorganic pigment which are generally used in pottery and paint industries. Spinel type or its solid solution pigments containing aluminum, chromium, cobalt and iron are preferable. The heat-resisting inorganic pigment used in this invention should be chemically stable at high temperature. Examples of the heat-resisting inorganic pigment are commercial products well known under trade names of Irgacolor and Drakenfield Color and are produced by Ciba-Geigy Company. The anti-rusting inorganic pigment contains a vanadium compound. Examples thereof are the pigments which are well known as Irgacolor yellow 2PGM and Drakenfield Color blue 41715. It is preferable to use a combination of a heat-resisting inorganic pigment and an anti-rusting inorganic pigment. The amount of the pigment used in this invention is 1–10 parts by weight, based on 100 parts by weight of the hydraulic calcium aluminate compound. When the amount of the pigment is below 1 part, the coloration effect is poor. When the amount of the pigment is above 10 parts, the thermal shock property of the coating film will decrease and the coating film is prone to peeling.

In this invention, the hydraulic calcium aluminate compound, the metallic oxide reinforcing agent and the pigment are respectively weighed, and fed into the ball-type grinding mill for grinding over 12 hours until they have a particle size capable of passing completely through a Tyler standard 170-mesh screen. Afterwards, they are further ground until 2.5% by weight thereof are retained by a Tyler standard 325-mesh screen.

The binder solution of the inorganic coating composition is formed by dissolving the soluble phosphate in the alkali-metal silicate solution. The alkali metal of the alkali-metal silicate solution is selected from sodium, potassium and lithium. The commercially available water glass, such as Sodium Silicate No.1, Sodium Silicate No.2 and Sodium Silicate No.3, may be used in this invention. The sodium silicate preferably has a mole ratio of $SiO_2/Na_2O$ from 2.1 to 3.9. Commercially available potassium silicate, which has a mole ratio of $SiO_2/K_2O$ from 3.1 to 3.9, and commercially available lithium silicate, which has a mole ratio of $SiO_2/Li_2O$ from 4.5 to 8.5, may also be used in this invention. The mole ratio of $SiO_2/M_2O$ is preferably about 3.5, wherein M represents Na, K and Li. Water is added into the alkali-metal silicate in order to achieve a predetermined concentration. When the mole ratio of $SiO_2/M_2O$ in the alkali-metal silicate is above the described range, the solubility of the alkali-metal silicate in water is small and the stability thereof is poor. When the mole ratio of $SiO_2/M_2O$ in the alkali-metal silicate is below the described range, the viscosity of the alkali-metal silicate solution is too low, and the coating will drip during application. The alkali-metal silicate used in the binder solution should be water-soluble. The suitable concentration range of the alkali-metal silicate solution is 20–57% by weight, and a concentration of 30% by weight is preferable.

The phosphate used in the binder solution should be soluble in the alkali-metal silicate solution, and may be sodium phosphate and potassium phosphate. Generally, soluble phosphates are orthophosphates, pyrophosphates, metaphosphates and polymeric phosphates. The phosphate suitable for this invention should be dissolvable as well as dispersible in the silicate solution. The combination of orthophosphate and pyrophosphate is preferable. The amount of the soluble phosphate is 1–40 parts by weight, preferably 5–10 parts by weight, based on 100 parts by weight of alkali-meal silicate solution. When the amount of the soluble phosphate is below 1 part by weight, a high heat-resisting result cannot be obtained, thereby decreasing the anti-corrosion effect. When the amount of the soluble phosphate is above 40 parts by weight, the solid phase reaction of the metal oxides of the curable powder is hindered, thereby decreasing the mechanical strength and the heat-resisting characteristic of the coating film.

The use of alkali-metal silicate as a binder in an inorganic paint material is known in the art. In the present invention, the alkali-metal silicate solution is used in combination with the phosphate to form a high heat-resistant binder. Due to the addition of the soluble phosphate into the alkali-metal silicate solution, the rate of the hydration reaction of the hydraulic calcium aluminate compound can be slowed, and the phosphate and the alkali-metal silicate will be gradually dehydrated and condensed. At a high temperature, the condensation reaction will be accelerated, thereby enhancing the thermal strength of the coating film.

When mixing the curable powder and the binder solution according to the present invention, the hydraulic calcium aluminate compound is cured or hardened by a hydration reaction, and the silicate is dehydrated and condensed to form an inorganic polymer. In case the mixture is subjected to a high temperature environment, the silanols in the silicate will continue to condense due to the initially increasing heat. The alkali metals of the silicate are enclosed in the siloxane thereof and are held firmly in position due to the entrance of cations having smaller ionic particle sizes, thereby producing an insoluble silicate polymer.

At the temperature elevated subsequently of the initial temperature increasing period, the phosphate in the binder solution tends to form an insoluble phosphate polymer like the silicate. Examples of cations having a smaller particle size may be $Al^{3+}$, $Mg^{2+}$, $Cr^{3+}$, $Ca^{2+}$ and $Ti^{2+}$, preferably $Mg^{2+}$, $Al^{3+}$, and $Cr^{3+}$. The heat-resistant strength and adhesion ability of the inorganic polymers can be improved through a selection of suitable metal ions. The binder solution containing the silicate and the phosphate functions as a strong binder and can form a stable inorganic polymer in the presence of heat.

During the reaction of the components of the inorganic coating composition according to this invention, the metal oxides of the metallic oxide reinforcing agent supply small particle cations, and at the gradually elevated temperature form, via a solid phase reaction, a composite oxide, i.e. a group of spinel compounds having spinel structures and the solid solution thereof. The coating film resulting therefrom has a high temperature resisting property and an increased chemical stability. The effect of thermal expansion and contraction of the coating film can also be alleviated thereby.

The inorganic coating composition according to this invention has high-heat-resistant, oxidation-resistant, corrosion-resistant and high hardness properties, and can be applied on a metal, such as carbon steels, low-alloy steels, stainless steels and aluminum steels. The carbon steels may be carbon steels for general structures, carbon steels for mechanical structural use, carbon steels for boilers and heat exchangers, hot rolled steels, cold rolled steels and rerolled steels. The configurations of the metals suitable for this invention are not limited to plates, sheets, tubes and bars. Any cast product and assembled apparatus can be coated by the inorganic coating composition of this invention. It can be realized that the inorganic coating composition of this invention can be used as a binder for refractories and refractory bricks, and as a fire-proof paint material for steel, wood, concrete and foam plastics.

The inorganic coating composition of this invention may be applied on a metal by spatula coating, brushing, roller costing, spray coating, filling in, etc. The coating can be applied on the metal two times or three times. Surface cleaning including removing dirt, oil and residue may be enough for the pretreatment of the metal. Other pretreatments, such as sandblasting and acid etching, may be dispensed with. In case the metal has rust, it can be cleaned by rubbing with a sand paper. The film thickness of the coating film is preferably about 60–70 μm when the coating is applied one time, and about 120 μm when the coating is applied two times. For efficient protection against corrosion at high temperature, it is preferable to apply the coating two times in order to avoid formation of pinholes and permeable pores.

The following examples are given in order to facilitate explanation of the present invention. The part and % of the components in the following examples are based on weight.

EXAMPLES A-1 TO A-3

TABLe 1

| | hydraulic calcium aluminate | | | | | | | |
|---|---|---|---|---|---|---|---|---|
| | Formulation (part) | | | | Typical chemical analysis (%) | | | |
| Examples | aluminum oxide | limestone | clay | ferric oxide | $Al_2O_3$ | CaO | $SiO_2$ | $Fe_2O_3$ |
| A-1 | 100 | 43 | 2 | 0.2 | 79.4 | 18.8 | 1.4 | 0.20 |
| A-2 | 100 | 65 | 5 | 0.2 | 71.3 | 25.4 | 2.8 | 0.23 |
| A-3 | 100 | 132 | 26 | 2 | 52.2 | 36.6 | 9.6 | 1.31 |

Table 1 shows the formulations of the hydraulic calcium aluminate compounds of Examples A-1 to A-3 according to this invention. Powdered aluminum oxide, limestone, clay and ferric oxide are respectively weighed and fed into a propeller-type solid mixer for mixing. The formed mixture is fired in an electric oven (TMH-5, manufactured by Yamato Co., Ltd. of Japan) at 1200° C. for 4 hours, and then cooled in air. A metal bowl and a rotor-speed mill (Pulveristte 14" Fritsch GmbH industiestrabe 8, Germany) are used for grinding the powdered hydraulic calcium aluminate compound into powder with a particle size of below 0.08 mm.

The aluminum oxide and ferric oxide used in the Table 1 are manufactured by Wako Pure Chemical Industries Ltd. of Japan. The limestone and clay are made in Taiwan.

EXAMPLES B-1 TO B-19

TABLE 2

| Examples | hydraulic calcium aluminate compound Examples | (part) | MgO (part) | $Al_2O_3$ (part) | $Cr_2O_3$ (part) | calcined fire clay (part) | $Fe_2O_3$ (part) | other minor oxide (part) | pigment (part) |
|---|---|---|---|---|---|---|---|---|---|
| B-1 | A-1 | 100 | 10 | 5 | | | | 1 | suitable amount |
| B-2 | A-1 | 100 | 15 | | 10 | | | 1 | |
| B-3 | A-1 | 100 | 10 | | | 10 | | 1 | suitable amount |
| B-4 | A-1 | 100 | 5 | | | 10 | 5 | 1 | |
| B-5 | A-2 | 100 | 15 | 5 | 5 | | | 1 | |
| B-6 | A-2 | 100 | 15 | | | 15 | | 1 | suitable amount |
| B-7 | A-2 | 100 | 10 | | | 20 | | 1 | suitable amount |
| B-8 | A-2 | 100 | 10 | 5 | 5 | 5 | | 1 | |
| B-9 | A-3 | 100 | 5 | 5 | | | 5 | 1 | |
| B-10 | A-3 | 100 | 15 | | 15 | | | 1 | |
| B-11 | A-3 | 100 | 10 | 5 | | 10 | | 1 | |
| B-12 | A-3 | 100 | 2 | | 2 | 20 | | 1 | |
| B-13 | A-3 | 100 | 10 | 10 | 10 | | | 1 | |
| B-14 | A-3 | 100 | 10 | 10 | 10 | 19 | | 1 | |
| B-15 | A-3 | 100 | 4 | | | | | 1 | suitable amount |
| B-16 | A-3 | 100 | 10 | | | | | 1 | suitable amount |
| B-17 | A-3 | 100 | 10 | 5 | 5 | | | 1 | |
| B-18 | A-3 | 100 | 10 | 5 | 5 | 10 | | 1 | |
| B-19 | A-3 | 100 | 15 | 10 | 10 | | | 1 | |

Table 2 shows the compositions of the curable powders of Examples B-1 to B-19 according to this invention. The components of these Examples are respectively weighed and fed into a ball-type grinding mill, wherein the components are mixed and ground for above 12 hours until the resultant powder can be retained on a 325-mesh sieve in an amount of 2.5% by weight. The hydraulic calcium aluminate compounds used in Table 2 are taken from Examples A-1 to A-3 prepared according to Table 1. The metal oxides used in the Examples are of commercial grade manufactured by Wako Pure Chemical Industries Ltd. or Kanto Chemical Co., Inc. of Japan. The pigments are commercial paint pigments, such as yellow 2GPM, blue 10336, black 10335 and brown 10364, sold under the trade name of Iagcolor and produced by Ciba-Geigy Company. The amounts of the pigments used range from 1 to 10 parts by weight and are weighed as desired for each Example in Table 2 in order to obtain a proper color. The minor oxides in Table 2 are selected from cobalt oxide, manganese oxide, nickel oxide, etc (manufactured by Wako Pure Chemical industries Ltd. or Kanto Chemical Co., Inc. of Japan).

EXAMPLES C-1 TO C-7

TABLE 3

| Examples | product model number | metal | $SiO_2$ (%) | $M_2O$ (%) | mole ratio |
|---|---|---|---|---|---|
| C-1 | WG-ND | Na | 29.4 | 14.7 | 2.1 |
| C-2 | WG-S | Na | 26.0 | 10.6 | 2.5 |
| C-3 | WG-N33 | Na | 23.5 | 7.1 | 3.4 |
| C-4 | WG-N40 | Na | 21.0 | 5.5 | 3.9 |
| C-5 | KASIL#6 | K | 25.6 | 12.6 | 3.1 |

TABLE 3-continued

| Examples | product model number | metal | $SiO_2$ (%) | $M_2O$ (%) | mole ratio |
|---|---|---|---|---|---|
| C-6 | KASIL#1 | K | 20.8 | 8.3 | 3.9 |
| C-7 | KL-40 | K, Li | 24.8 | 11.0 | 3.5 | wherein, M represents Na, K and Li.

Table 3 shows the compositions of the alkali-metal silicate compounds of Examples C-1 to C-7 according to this invention. The alkali-metal silicate compounds used in the Examples are of commercial grade well known under the trade name of PQ silica gel by Asia Silica Gel Industrial Company of Taiwan.

EXAMPLES C-11 TO C-17

TABLE 4

| | silicate solution | | water added (+) or water removed (−) (g) | Typical chemical analysis | |
|---|---|---|---|---|---|
| Examples | Examples | (part) | | $SiO_2$ (%) | $M_2O$ (%) |
| C-11 | C-1 | 100 | +47 | 20.0 | 10.0 |
| C-12 | C-2 | 100 | +22 | 21.3 | 8.7 |
| C-13 | C-3 | 100 | +2 | 23.0 | 7.0 |
| C-14 | C-4 | 100 | −12 | 23.9 | 6.3 |
| C-15 | C-5 | 100 | +27 | 20.2 | 9.9 |
| C-16 | C-6 | 100 | −3 | 21.4 | 8.6 |
| C-17 | C-7 | 100 | +22 | 20.5 | 9.4 |

Table 4 shows the mole ratios of $SiO_2/M_2O$ of the alkali-metal silicate solutions of Examples C-11 to C-17 according to this invention. The alkali-metal silicate compounds of Examples C-1 to C-7 are added with water or undergoes a vacuum concentration in order to obtain the alkali-metal silicate solution with a solid content of 30%.

EXAMPLES 1 TO 21

TABLE 6

| Examples | Components curable powder Examples | (part) | binder solution Examples | (part) | appearance | thermal shock properties | impact properties | salt water resisting properties | adhesion characteristics | Mohs' hardness |
|---|---|---|---|---|---|---|---|---|---|---|
| 1 | B-1 | 100 | D-1 | 75 | ⊙ | △ | △ | △ | — | — |
| 2 | B-2 | 100 | D-2 | 75 | ⊙ | ⊙ | ⊙ | ⊙ | ⊙ | 7 |
| 3 | B-3 | 100 | D-3 | 75 | ⊙ | ⊙ | △ | ⊙ | — | — |
| 4 | B-4 | 100 | D-4 | 75 | ⊙ | ⊙ | ⊙ | ⊙ | ⊙ | 7 |
| 5 | B-5 | 100 | D-5 | 75 | ⊙ | ⊙ | ⊙ | ⊙ | ⊙ | 7 |
| 6 | B-6 | 100 | D-6 | 75 | ⊙ | △ | △ | ⊙ | — | — |
| 7 | B-7 | 100 | D-7 | 75 | ⊙ | ⊙ | △ | ⊙ | — | — |
| 8 | B-8 | 100 | D-8 | 75 | ⊙ | ⊙ | ⊙ | ⊙ | ⊙ | 8.5 |
| 9 | B-9 | 100 | D-9 | 75 | ⊙ | △ | △ | ⊙ | — | — |
| 10 | B-10 | 100 | D-10 | 75 | ⊙ | ⊙ | ⊙ | ⊙ | ⊙ | 7 |
| 11 | B-11 | 100 | D-11 | 75 | ⊙ | ⊙ | ⊙ | ⊙ | ⊙ | 8.5 |
| 12 | B-12 | 100 | D-12 | 75 | ⊙ | △ | △ | △ | — | — |
| 13 | B-13 | 100 | D-13 | 75 | ⊙ | ⊙ | ⊙ | ⊙ | ⊙ | 8 |
| 14 | B-14 | 100 | D-14 | 75 | ⊙ | △ | △ | △ | — | — |
| 15 | B-15 | 100 | D-15 | 75 | ⊙ | △ | △ | △ | — | — |
| 16 | B-16 | 100 | D-16 | 75 | ⊙ | ⊙ | △ | △ | — | — |
| 17 | B-16 | 100 | D-16 | 50 | ⊙ | ⊙ | △ | △ | — | — |
| 18 | B-16 | 100 | D-16 | 100 | ⊙ | ⊙ | △ | △ | — | — |
| 19 | B-17 | 100 | D-16 | 75 | ⊙ | ⊙ | ⊙ | ⊙ | ⊙ | 7 |
| 20 | B-18 | 100 | D-17 | 75 | ⊙ | ⊙ | ⊙ | ⊙ | ⊙ | 8.5 |
| 21 | B-19 | 100 | D-18 | 75 | ⊙ | ⊙ | ⊙ | ⊙ | ⊙ | 8 |

EXAMPLES D-1 TO D-18

TABLE 5

| Examples | Formulation silicate solution Examples | (part) | soluble phosphate | (part) |
|---|---|---|---|---|
| D-1 | C-11 | 100 | $Na_3PO_4 \cdot 12H_2O$ | 12 |
| D-2 | C-13 | 100 | $Na_3PO_4 \cdot 12H_2O$ | 12 |
| D-3 | C-15 | 100 | $Na_4P_2O_7 \cdot 10H_2O$ | 5 |
| D-4 | C-16 | 100 | $Na_5P_3O_{10}$ | 3 |
| D-5 | C-12 | 100 | $K_3PO_4$ | 11 |
| D-6 | C-13 | 100 | $(NaPO_3)_n$, n > 3 | 11 |
| D-7 | C-14 | 100 | $Na_4P_2O_7 \cdot 10H_2O$ | 25 |
| D-8 | C-15 | 100 | $Na_3PO_4 \cdot 12H_2O$ | 12 |
| D-9 | C-11 | 100 | $Na_3PO_4 \cdot 12H_2O$ | 11 |
| D-10 | C-12 | 100 | $K_3PO_4$ | 5 |
| D-11 | C-14 | 100 | $(NaPO_3)_n$, n > 3 | 5 |
| D-12 | C-16 | 100 | $Na_4P_2O_7 \cdot 10H_2O$ | 40 |
| D-13 | C-14/C-15 | 50/50 | $(NaPO_3)_n$, n > 3 | 6 |
| D-14 | C-14/C-16 | 67/33 | $Na_3PO_4 \cdot 12H_2O/K_3PO_4$ | 10/2 |
| D-15 | C-14 | 100 | $Na_3PO_4 \cdot 12H_2O$ | 1 |
| D-16 | C-13 | 100 | $Na_3PO_4 \cdot 12H_2O$ | 10 |
| D-17 | C-13 | 100 | $K_3PO_4$ | 5 |
| D-18 | C-17 | 100 | $Na_3PO_4 \cdot 12H_2O$ | 5 |

Table 5 shows the compositions of the binder solutions of Examples D-1 to D-18 according to this invention. The alkali-metal silicate solution and the soluble phosphate are weighed respectively and fed into a container for homogeneous stirring. The phosphates used in the Examples are of commercial grade manufactured by Wako Pure Chemical Industries Ltd. or Kanto Chemical Co., Inc. of Japan.

Table 6 shows the compositions of the inorganic coating materials of Examples 1 to 21 according to this invention and the test results thereof. The curable powder and the binder solution in each Example are taken respectively from Tables 2 and 5. The amount of the curable powder is 100 parts by weight, whereas the amount of the binder solution varies from 50 to 100 parts by weight. The curable powder and the binder solution are blended together by a portable agitator for about 30 seconds, and are then applied to a commercially available low-carbon hot rolling steel plate of 150×70×2.7 mm to form a test plate. A pretreatment is carried out for the low-carbon hot rolling steel plate by degreasing the steel plate with a solvent, but without any acid etching and sand spraying steps for the removal of black skins and rust. The coated steel plate is kept for 7 days at room temperature for air drying in order to form a cured coating film on the steel plate. When the coating is applied one time, the cured coating film has a thickness of 60–70 μm, whereas a cured coating film of 120 μm is obtained when the coating is applied two times. The detailed description of the test method and test results will be described in the succeeding paragraphs.

COMPARATIVE EXAMPLES 1 TO 6

TABLE 7

| Comparative Examples | Components | | | | | Physical properties | | | | |
|---|---|---|---|---|---|---|---|---|---|---|
| | high aluminum containing cement Examples | binder | | | water (part) | appearance | thermal shock properties | impact properties | salt water resisting properties | adhesion characteristics |
| | | (part) | sodium silicate solution | | | | | | | |
| | | | product model number | (part) | | | | | | |
| 1 | 1 | 100 | — | — | 75 | X | X | X | X | — |
| 2 | 3 | 100 | — | — | 75 | X | X | X | X | — |
| 3 | 3 | 100 | WG-ND | 75 | — | Δ | X | X | X | — |
| 4 | 3 | 100 | WG-N33 | 75 | — | Δ | X | X | X | — |
| 5 | 3 | 100 | WG-N40 | 75 | — | Δ | X | X | X | — |
| 6 | 3 | 100 | KASIL#6 | 75 | — | Δ | X | X | X | — |

Table 7 shows the compositions of the coating materials of Comparative Examples 1 to 6 and the test result thereof. The coating materials contain a commercially available high aluminum containing cement used for refractories. In Comparative Examples 1 and 2, water is added thereinto, whereas in Comparative Examples 3 to 6, the silicate solution is added thereinto. The prepared coating material is also applied to the above described low-carbon hot rolling steel plate to obtain a test plate.

The test methods and the symbols representative of the test results shown in Tables 6 and 7 are explained as follows:

(1) appearance: The results are obtained by observing the appearance of the coating film with naked eyes. (JIS H8304 Section 3.1)

⊚: smooth, no cracking, no lump formation, no additional foreign substances and no other defects detrimental to use.

Δ: with cracking but without peeling.

x: with both cracking and defects detrimental to use.

(2) thermal shock properties: The test plate is heated in an electric oven for about 10 minutes at 800° C., and then cooled in air. The above procedure is performed repeatedly for 10 times. After cooling for 1 hour, the appearance of the coating film is observed with the naked eyes. (JIS H8666 Section 4.5)

⊚: no color changes, no cracking and no peeling.

Δ: with little color change but without any defects detrimental to use.

x: with cracking and peeling.

(3) impact properties after rapid heating and chilling: The central portion of the test plate is heated at about 1700° C. for 5 minutes with flame injected from a propane jet lamp, and is then put immediately into cool water (23° C.) for 2 minutes for chilling. The above procedure is performed repeatedly for 5 times. After above 1 hour at room temperature, the appearance is observed with the naked eyes.

⊚: with little color changes but without any cracking and peeling.

Δ: with little cracking but without peeling.

x: with cracking and peeling.

(4) salt water resisting properties: The test plate with the coating film applied two times is dipped in a sodium chloride solution of 3W/V% for 96 hours. Afterwards, the appearance is observed.

⊚: no peeling, no cracking and no rusting.

X: with peeling, cracking and rusting.

(5) adhesion characteristics: After the above-mentioned impact test, a 204 g steel ball with a diameter of 36.5 mm is caused to fall down by gravity from a height of 45 cm onto the central portion of the test plate in order to observe the peeling condition. Such a test is suitable for a test plate having good impact property after rapid heating and chilling. (JIS R4203 Section 6.1 (3))

⊚: no peeling.

Δ: no peeling phenomenon extending to the substrate.

x: with peeling phenomenon extending to the substrate.

(6) Mohs' hardness: Mohs' scale (MH-10N type, made by Japan Nakamura Company) is used to measure the hardness of the test plate which has undergone the above-mentioned adhesion test.

From Tables 6 and 7, it can be noted that this invention enhances the appearance, the thermal shock property and the salt water resisting property of the coating film. Particularly, the coating film formed according to this invention exhibits excellent adhesion and impact characteristics. The coating materials of the Comparative Examples do not contain the metallic oxide reinforcing agent and the soluble phosphate of this invention. Therefore, the coating film formed thereby has a relatively poor thermal shock property and even suffers from peeling.

As mentioned hereinbefore, when the coating materials of the present invention are used, it is not necessary to remove rust from the substrate and to treat chemically the surface thereof. The surface may just be degreased and cleaned before application. After application, the hydraulic calcium aluminate compound in the curable powder used in the present invention reacts rapidly by hydration with the water in the binder solution to form a cured hydrated calcium aluminate. During the hydration reaction, the polyvalent metal ions, such as $Mg^{2+}$, $Ca^{2+}$ and $Al^{3+}$, also react with the alkali-metal silicate, whereby insoluble hydrated compounds are formed and the silicate is gelled. The resulting coating film on the steel substrate may undergo further reaction when it is placed in a high temperature environment. That is to say, the gelled alkali-metal silicate and the phosphate are dehydrated and condensed to form inorganic polymers having a binding effect. In case the substitution of divalent cations occurs continuously in the inorganic polymers, ionic bonds may be introduced to form glassy inorganic polymers having covalent bonds and ionic bonds, thereby producing a strong and highly heat-resisting binder. Particularly, the network structures of the glassy inorganic polymers containing small particle ions are bonded strongly together, thereby increasing considerably the glass transition temperature and the chemical stability of the coating film. Furthermore, at the temperature of 1000° C., the metal oxides of the metallic oxide reinforcing agent, such as MgO, $Al_2O_3$, $Cr_2O_3$ and $Fe_2O_3$, and the rust formed on the steel surface, i.e. iron oxides (FeO, $Fe_3O_4$ and $Fe_2O_3$), are spinel materials ($RO.R_2O_3$, where R is metal). Such spinel materials will undergo a solid phase reaction due to the high temperature and form a group of spinel compounds ($RO.R_2O_3$) having spinel structures and the solid solution thereof. In the formula ($RO.R_2O_3$), RO is MgO, FeO or CaO, and $R_2O_3$ is $Al_2O_3$, $Cr_2O_3$ or $Fe_2O_3$. The above-mentioned spinel oxide compounds can be combined interchangeably to form various spinel compound groups which may be in the form of a stable spinel crystal or a solid solution thereof. The spinel crystal group or the solid solution thereof may contain $MgO.Fe_2O_3$, $FeO.Cr_2O_3$, $FeO.Al_2O_3$, $MgO.Al_2O_3$, $MgO.Cr_2O_3$, and $FeO.Fe_2O_3$. Particularly, $MgO.Al_2O_3$ and $FeO.Cr_2O_3$ are important heat-resisting ceramic materials.

Therefore, a metallic material which is coated with the inorganic coating composition according to this invention is very passive to corrosion and has high-heat resisting and anti-rusting properties.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

We claim:

1. An inorganic coating composition comprising:

a curable powder containing a hydraulic calcium aluminate compound, a metallic oxide reinforcing agent and a pigment, said metallic oxide reinforcing agent being in an amount of 5–50 parts by weight and said pigment being in an amount of 1–10 parts by weight based on 100 parts by weight of said hydraulic calcium aluminate compound, said metallic oxide reinforcing agent being selected from the group consisting of a composite oxide and a mixture of at least two oxides of different metals, said composite oxide being selected from the group consisting of spinel ($MgO.Al_2O_3$), zircon ($ZrO_2.SiO_2$), mullite ($3Al_2O_3.2SiO_2$), calcined talc ($3MgO.4SiO_2$), and ceramic fibers, said oxides of different metals being selected from the group consisting of silica, zirconia, titanium oxide, calcined fired clay, aluminum oxide, chromium oxide, ferric oxide, cobalt oxide, nickel oxide, magnesium oxide, hard-burned lime (CaO), and manganese oxide; and a binder solution containing an aqueous alkali-metal silicate solution and a soluble phosphate, wherein the aqueous alkali-metal silicate in said aqueous alkali-metal silicate solution has a concentration of 20–57% by weight of the aqueous alkali-metal silicate solution, the alkali-metal silicate of said aqueous alkali-metal silicate solution being selected from the group consisting of sodium silicate having a mole ratio of $SiO_2/Na_2O$ from 2.1 to 3.9, potassium silicate having a mole ratio of $SiO_2/K_2O$ from 3.1 to 3.9 and lithium silicate having a mole ratio of $SiO_2/Li_2O$ from 4.5 to 8.5, said soluble phosphate being in an amount of 1–40 parts by weight based on 100 parts by weight of said aqueous alkali-metal silicate solution and being selected from the group consisting of sodium phosphate and potassium phosphate;

wherein 100 parts by weight of said curable powder is present in said inorganic coating composition for every 50–100 parts by weight of said binder solution.

2. An inorganic coating composition as claimed in claim 1, wherein said hydraulic calcium aluminate compound contains at least 50% by weight of aluminum oxide.

3. An inorganic coating composition as claimed in claim 1, wherein said pigment is selected from a heat-resisting inorganic pigment, an anti-rusting inorganic pigment and a mixture thereof.

4. An inorganic coating composition as claimed in claim 3, wherein said anti-rusting inorganic pigment contains a vanadium compound.

\* \* \* \* \*